United States Patent
Grinshpon et al.

(10) Patent No.: US 9,235,673 B2
(45) Date of Patent: Jan. 12, 2016

(54) APPARATUS FOR AND A METHOD OF MAKING A HIERARCHICAL INTEGRATED CIRCUIT DESIGN OF AN INTEGRATED CIRCUIT DESIGN, A COMPUTER PROGRAM PRODUCT AND A NON-TRANSITORY TANGIBLE COMPUTER READABLE STORAGE MEDIUM

(71) Applicants: Amir Grinshpon, Tel-Aviv (IL); Osnat Arad, Hertzelia (IL); Asher Berkovitz, Kiryat Ono (IL)

(72) Inventors: Amir Grinshpon, Tel-Aviv (IL); Osnat Arad, Hertzelia (IL); Asher Berkovitz, Kiryat Ono (IL)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 101 days.

(21) Appl. No.: 14/288,531

(22) Filed: May 28, 2014

(65) Prior Publication Data
US 2015/0347655 A1 Dec. 3, 2015

(51) Int. Cl.
*G06F 17/50* (2006.01)

(52) U.S. Cl.
CPC ........ *G06F 17/5068* (2013.01); *G06F 17/5077* (2013.01); *G06F 17/5031* (2013.01); *G06F 17/5045* (2013.01); *G06F 2217/84* (2013.01)

(58) Field of Classification Search
CPC ............ G06F 17/5045; G06F 17/5031; G06F 17/5077; G06F 2217/84
USPC ......... 716/101, 106, 108, 110–111, 113, 132, 716/134, 126, 130
See application file for complete search history.

(56) References Cited

U.S. PATENT DOCUMENTS

| 6,286,128 B1 | 9/2001 | Pileggi et al. | |
| 8,015,532 B2 | 9/2011 | Alpert et al. | |
| 2014/0282338 A1* | 9/2014 | Nayak | G06F 17/5081 716/120 |
| 2014/0298281 A1* | 10/2014 | Varadarajan | G06F 17/5045 716/113 |

FOREIGN PATENT DOCUMENTS

WO 2008005622 A2 1/2008

\* cited by examiner

*Primary Examiner* — Stacy Whitmore

(57) ABSTRACT

An apparatus for and a method of making a hierarchical integrated circuit design of an integrated circuit design, a computer program product and a non-transitory tangible computer readable storage medium are provided. The apparatus comprises an input for receiving an hierarchical integrated circuit design, a selector for selecting a candidate output pin, a cloner for adapting the hierarchical integrated circuit design, a re-connector for adapting the hierarchical integrated circuit design, and an output for outputting the adapted hierarchical circuit design. Optionally, the apparatus comprises a timing improver. The apparatus selects a candidate output pin of an IP block that is a node on at least two timing paths that have contradictory timing violations. The candidate output pin is cloned and at least one of the timings paths is connected to the cloned output pin for one of the instances of the IP block.

20 Claims, 5 Drawing Sheets

APPARATUS FOR AND A METHOD OF MAKING A HIERARCHICAL INTEGRATED CIRCUIT DESIGN OF AN INTEGRATED CIRCUIT DESIGN, A COMPUTER PROGRAM PRODUCT AND A NON-TRANSITORY TANGIBLE COMPUTER READABLE STORAGE MEDIUM

FIELD OF THE INVENTION

This invention relates in general to hierarchical integrated circuit design and more in particular to apparatuses for and methods of making a hierarchical integrated circuit design. The invention further relates to a computer program product and a non-transitory tangible computer readable storage medium.

BACKGROUND OF THE INVENTION

Designing an integrated circuit is a complex process in which a functional and/or operational specification for the integrated circuit is transformed in several operations into a physical integrated circuit layout which exactly describes where on a silicon wafer which materials may be implanted, deposited or removed to manufacture the integrated circuit. Using a hierarchical design style is common practice in the field of designing a large scale integrated circuit system. Separate functional blocks are designed once and they are instantiated one or more times in a hierarchical design description. In general, the term IP block is used for such a separate functional block. For example, the hierarchical top level of the hierarchical integrated circuit design may be referred to as 'the whole design' and at the top level several separately designed/described functional blocks are instantiated and connected to each other. On their turn, the instantiated functional blocks may also instantiate other functional blocks and provide connections between the other functional blocks and circuitry defined in the instantiated function blocks.

In order to be able to meet the functional and/or operational specification, several timing requirements are imposed on the integrated circuit design. For example, when the integrated circuit is designed to operate at a specific clock frequency, signals have to travel through the integrated circuit at a minimum speed and they may also not travel too fast to prevent that signals arrive a clock cycle too early at the specific node of the integrated circuit. The timing requirements are specified for timing paths. A timing path represents an electrical path through which a specific signal travels from one node to another node in the integrated circuit. Timing analysis tools are able to detect whether the timing paths fulfill under a set of operational conditions the timing requirements. When a timing violation of the timing requirements of a specific timing path is found, these tools at least report the violations. Automatic optimization tools may be used to adapt the design of the integrated circuit design such that, as much as possible, timing violations are solved. For example, automatic optimization tools are able to speed up certain parts of the integrated circuit design. Alternatively, or in addition, the automatic optimization tools are able to slow down certain parts of the integrated circuit design such that specific timing paths better meet their requirements. Speeding up and slow down certain parts of the integrated circuit design may, for example, result in changing sizes of gates and/or insertion of buffers.

In hierarchical integrated circuit designs a specific IP block with an output pin may be instantiated several times. At the different instances of the specific IP block an instance of the output pin may be a node on differing timing paths. It might be that at least two of the different timing paths through the instance(s) of the output pin do not meet the timing requirements imposed on the at least two different timing paths. It might also be that a solution for the timing requirement violations has to be found inside the specific IP block. However, when a solution to solve the timing requirement violations is contradictory because the timing requirements are contradictory, finding a solution inside the specific IP block may be impossible. Contradictory may refer to, for example, a solution which requires speeding up and slowing down the circuitry that provides the signal to the output pin. A well-known way of solving such a conflict is that the hierarchy of the integrated circuit design is completely, or partially, removed by flattening at least one of the instances of this IP block into the higher level design IP block. Another well-known way of solving such a conflict is that the IP block is duplicated under another name and one of the instances is replaced by the duplicated IP block, thereby creating two IP blocks that are (in so far it concerns the violated timing requirements) independent. Both solutions increase the amount of data used to describe the integrated circuit design and thereby increase design effort and design complexity.

Published U.S. Pat. No. 8,015,532B2 discloses a timing-driven cloning method. In the method of the cited US patent a gate is cloned, i.e., a layout portion that represents a logical function is cloned. In the context of a hierarchical integrated circuit design, this would result in either flattening a part of the integrated circuit design or cloning the IP block that represents the specific gate.

SUMMARY OF THE INVENTION

The present invention provides an apparatus for making a hierarchical integrated circuit design, a method of making a hierarchical integrated circuit design, a non-transitory tangible computer readable storage medium as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals.

DETAILED DESCRIPTION OF THE PREFERRED EMBODIMENTS

Figure 1:
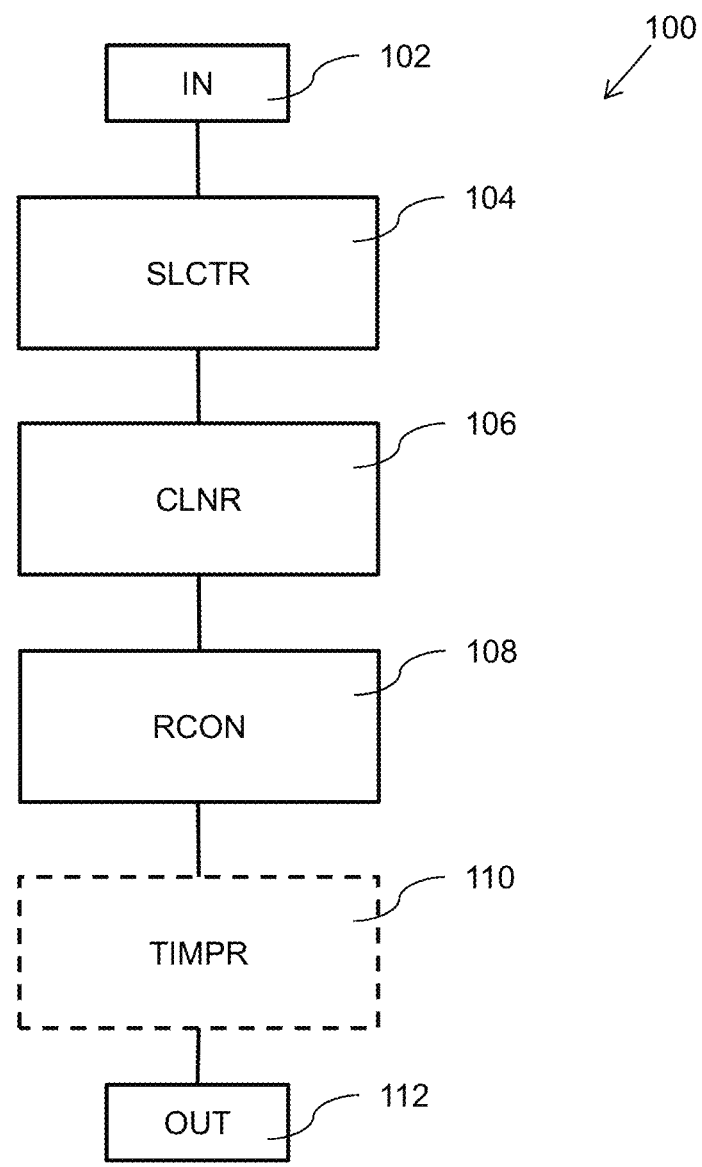
FIG. 1 schematically shows a block diagram of an example of an apparatus for making a hierarchical integrated circuit design, FIG. 2 schematically shows a flow-chart of an example of a method of making a hierarchical integrated circuit design, FIG. 3a schematically shows an example of an IP block A, FIG. 3b schematically shows an example of an integrated circuit design, FIG. 4a schematically shows an example of an adapted IP block A, FIG. 4b schematically shows an example of an adapted integrated circuit design, FIG. 5 schematically shows an exemplary user interaction system.

In the following, for sake of understanding, the apparatus of FIG. 1 is described in operation. However, it will be apparent that the respective units or elements of the apparatus are arranged to perform the functions being described as performed by them, and that the invention is not limited to the apparatus operating.

Figure 3A:
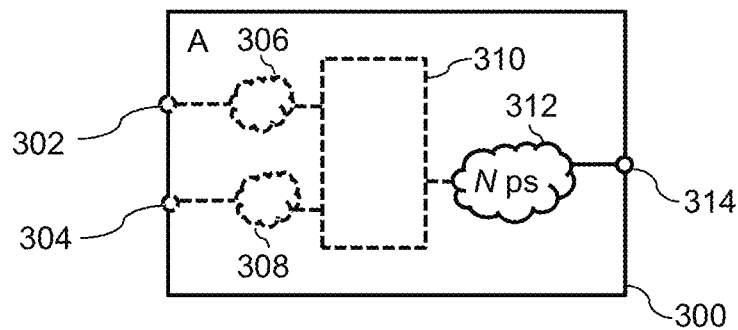
Figure 3B:
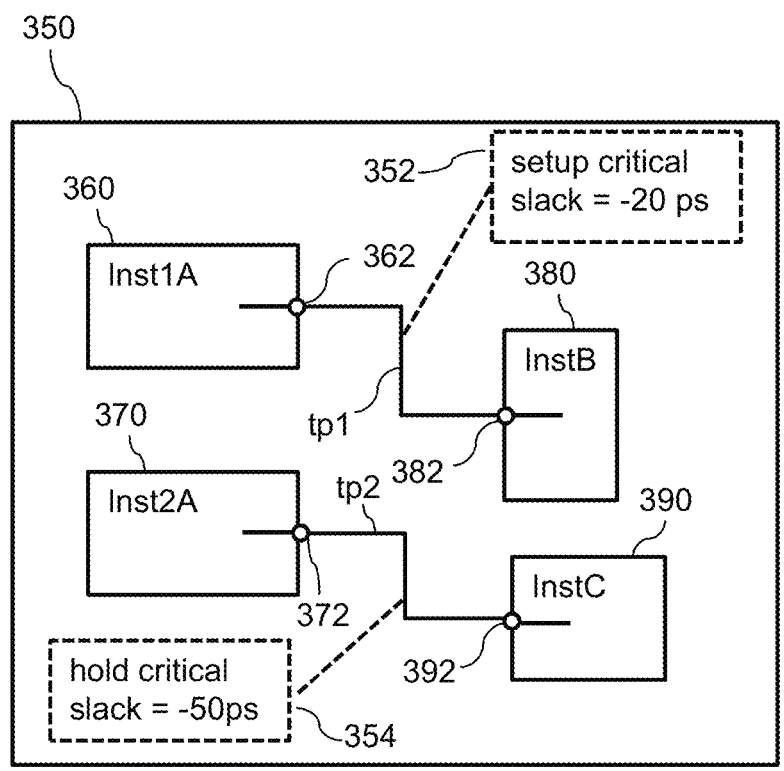

FIG. 1 schematically shows an example of an apparatus 100 for making a hierarchical integrated circuit design. The apparatus 100 comprises an input IN 102, a selector SLCTR 104, a cloner CLNR 106, a re-connector RCON 108 and an output OUT 112. The input IN 102 receives input data which comprises an hierarchical integrated circuit design and one or more timing characteristics of timing paths in the hierarchical integrated circuit design. In the context of FIGS. 3a and 3b examples of such input data are discussed. The hierarchical integrated circuit design comprises a set of IP blocks and one or more instances of at least one IP block of the set. The IP blocks represent portions of the integrated circuit design and at least one instantiated IP block has at least one output pin. The timing characteristics comprise information on timing violations for timing paths in the hierarchical integrated circuit design. The selector SLCTR 104 selects a candidate output pin belonging to a specific IP block of the set where the candidate output pin is coupled to at least a first timing path having a timing violation and is coupled to a second timing path, wherein the second timing path may not provide enough timing slack to solve the timing violation of the first timing path. The selector SLCTR 104 is coupled to the input IN 102 for receiving the hierarchical integrated circuit design and the timing characteristics. The cloner CLNR 106 adapts the hierarchical integrated circuit design and creates a cloned output pin in the specific IP block. The cloned output pin may be an additional output pin in the specific IP block. The cloned output pin has a logical output equivalent to the logical output of the candidate output pin. The cloner CLNR 106 is coupled to the selector SLCTR 104 for receiving the selected candidate output pin, the hierarchical integrated circuit design and the timing characteristics. The re-connector RCON 108 adapts the hierarchical integrated circuit design and reconnecting one of the first timing path and the second timing path to the cloned output pin of one of the instance of the specific IP block to which the one of the first timing path and the second timing path is connected. The re-connector RCON 108 is coupled to the cloner CLNR 106 for receiving the adapted hierarchical integrated circuit design and information on the cloned output pin. The output OUT, 112 outputs the adapted hierarchical circuit design to, for example, a tool which subsequently optimizes the first timing path and/or the second timing path.

Hereinafter, in the context of FIGS. 3a, 3b, 4a and 4b, an example of a hierarchical integrated circuit design is provided and the operation of the above discussed apparatus 100 is further discussed.

With the above described apparatus 100, the hierarchy of the integrated circuit design may be left unaltered and duplication of IP blocks may be prevented. This may prevent that the effort of adapting and maintaining the hierarchical integrated circuit design significantly increases. This may also prevent that the hierarchical integrated circuit becomes much more complex. The above described apparatus 100 may allow a possibility to adapt the design of a single IP block to solve timing conflicts relating to an output pin of the single IP block without significantly altering other parts of the hierarchical integrated circuit design. When only a single IP block has to be adapted, implementing a solution for resolving the timing conflict may effectively become a local issue instead of an issue that relates to several IP blocks (or in a worst case the whole hierarchical integrated circuit design).

In an example, the apparatus 100 also comprises a timing improver TIMPR 110 that adapts the hierarchical integrated circuit design to improve timing characteristics of at least the first timing path and, optionally, of the second timing path.

The above described apparatus 100 is schematically drawn by means of several hardware blocks that are coupled to each other in a sequential manner. However, other architectures are possible as well. In an example, the apparatus 100 comprises a data storage (not shown) in which the received hierarchical integrated circuit layout, the adapted hierarchical integrated circuit layout, the timing characteristics and information on the selected candidate output pin and/or the cloned output pin may be stored. The input IN 102, the selector SLCTR 104, the cloner CLNR 106, the re-connector RCON 108, the timing improver TIMPR 110 and/or the output OUT 112 may be to read and write from and into this data storage. The above system 100 may also comprise a controller (not shown) for controlling the operational of the different functional hardware blocks.

Figure 2:
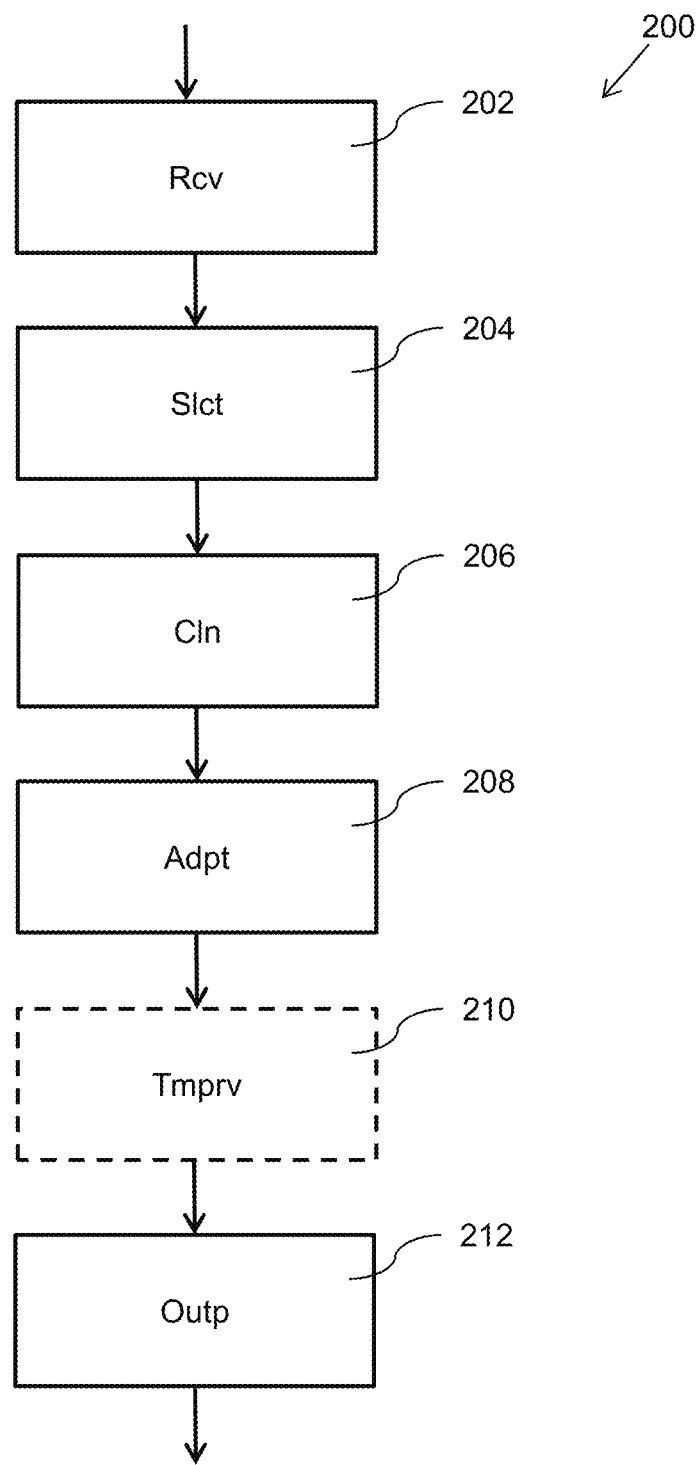

FIG. 2 schematically presents an example of a method 200 of making a hierarchical integrated circuit design. The method 200 may be executed by the apparatus as discussed above in the context of FIG. 1. The method 200 comprises receiving Rcv 202 an hierarchical integrated circuit design and one or more timing characteristics of timing paths in the hierarchical integrated circuit design. The hierarchical integrated circuit design comprises a set of IP blocks and one or more instances of at least one IP blocks of the set. The IP blocks of the set represent portions of the integrated circuit design. At least one of the instantiated IP blocks has at least one output pin. The timing characteristics comprise information on timing violations for timing paths in the hierarchical circuit design. The method 200 further comprises selecting Slot 204 a candidate output pin belonging to a specific IP block of the set where the candidate output pin is coupled to at least a first timing path having a timing violation and is coupled to a second timing path. Therein the second timing path may not provide enough timing slack to solve the timing violation of the first timing path. The method 200 further comprises cloning Cln 206 the selected candidate output pin by adapting the hierarchical integrated circuit design and creating in the specific IP block a cloned output pin. The cloned output pin may be an additional output pin in the specific IP block that has a logical output equivalent to a logical output the candidate output pin. The method 200 further comprises adapting Adpt 208 the hierarchical integrated circuit design to reconnect one of the first timing path or the second timing path to the cloned output pin of one of the instances of the specific IP block to which the one of the first timing path and the second timing path is connected. The method 200 further comprises outputting Outp 212 the adapted hierarchical integrated circuit design.

Hereinafter, in the context of FIGS. 3a, 3b, 4a and 4b, the operation of the above discussed method 200 is further discussed.

In an example, the method 200 also comprises improving Tmpry 210 timing characteristics of at least the first timing path by further adapting the hierarchical integrated circuit design. When the second timing path also comprises a violated timing requirement, the timing characteristics of this second timing path may be improved as well by adapting the hierarchical integrated circuit design.

In an example, the received hierarchical integrated circuit design comprises a gate level netlist of the hierarchical integrated circuit design. In this example, the cloning Cln 206 the selected candidate output pin and adapting Adpt 208 the hierarchical layout to reconnect one of the at least two timing paths may be performed by adapting the gate level netlist.

In an example, the received hierarchical integrated circuit design further comprises a physical layout of the hierarchical integrated circuit design. In this example, the further adapting of the hierarchical integrated circuit design for improving Tmprv, 210 timing characteristics is performed by at least adapting the physical layout.

In an example, the timing paths comprise timing paths of the types hold and setup. The first timing path may be of a first type being one of hold and setup, and the second timing path may be of a second type being the another one of hold and setup. Hold and setup timing requirements are, for example, defined with respect to edges of a reference clock signal. A timing path of the type hold has a timing requirement which defines that the signal transferred via this timing path may not change until a specific time interval after, for example, an edge of the reference clock signal. A timing path of the type setup has a timing requirement which defines that the signal transmitted via this timing path is available a specific time interval before, for example, an edge of the reference clock signal. A single timing path can also be of the type hold and setup when it has a requirement that the signal transferred via this timing path has to arrive at a specific location in the hierarchical integrated circuit design (at the end of the timing path) within a specific time interval relatively to, for example, an edge of the reference clock signal.

In an example, the timing characteristics comprise timing violations information for specific timing paths. Timing violations may be expressed as negative slack values in the time domain. The timing characteristics may also comprise positive slack values in the time domain for timing paths not violating timing requirements. The sum of the slack of the first timing path and the second timing path may be smaller than a predefined threshold value. The predefined threshold value is, for example, 0, or, for example 10 ps, or, for example, 20 ps. Thus, in this example a selection criterion is defined for selecting Slot, 204 of the candidate output pin: a first timing path connected to it has a negative slack value, the second timing path also has a negative slack value or a positive slack value that is at least the predefined threshold value lower than the absolute value of the first timing path.

In an example, when the candidate output pin is coupled to more than two timing paths, the first timing path is of the first type has the most negative slack value. The second timing path is one of the timing paths of the second type that is coupled to the candidate output pin and has the smallest slack value. Thus, this example defines further selection criteria for selecting Slot 204 the candidate output pin. For example, the predefined threshold value is 0 and different instances of a single output pin are, for example, a node on one of the subsequent four timing paths (1) to (4): (1) timing path of type hold, slack value −50 ps, (2) timing path of type hold, slack value −20 ps, (3) timing path of type setup, slack value 1 Ops, (4) timing path of type setup, slack value 40 ps. Then, while selecting Slot 204 the candidate output pin, the first timing path is the above timing path (1) because timing path (1) violates a timing requirement, because timing path (1) is the timing path with the most negative slack value, and because none of the other timing paths (also not timing path (3) which has a small positive slack of 10 ps) has enough slack to solve the worst timing violation of all timing paths going through the candidate output pin.

In an example, the specific IP blocks comprise logic for providing the logical output of the specific IP block. The logic may be coupled by an electrical conductor to the selected output pin. The cloning Cln 206 of the selected candidate output pin comprises coupling the cloned output pin to the logic by an additional electrical conductor for proving the logical output to the cloned output pin. In the context of a gate level netlist, the electrical conductor is formed by a net.

FIGS. 3a and 3b schematically show an example of input data of the apparatus for making a hierarchical integrated circuit design and the method of making a hierarchical integrated circuit design.

FIG. 3a schematically shows an example of an IP block A 300. The IP block represents a portion of an integrated circuit design. The IP block is described at least by a gate level netlist, for example, in the Verilog format. Additionally the IP block may also be provided as a physical design for a portion of an integrated circuit layout.

The gate level netlist may define how specific transistors ("gates") are coupled to each other via electrical conductors (the "nets"). By defining how the gates are interconnected, a specific logical function, or a specific logical operation, may be defined. The specific logical function or logical operation may in many cases performed in dependence of a signal received at one or more input pins of the IP block and the results of the logical function or logical operation may be provided to one or more output pins of the IP block. The gate level netlist may be synthesized on basis of a functional description of the IP block in a hardware description language (e.g. VHDL)—another description of this process is: "compiling the description of the IP block in the hardware description language to obtain the gate level netlist". The gate level netlist may also define which specific gates are used (e.g. size of gates, which type of gates) and may also define the characteristics of the electrical conductors in between the gates (such as, for example, width/length of the wires, the thickness of the wires, etc.). The information about the characteristics of the gates and the wires is used by timing analysis tools to determine timing characteristics of the timing paths in the gate level netlist.

When the IP block is also provided as a design for a portion of an integrated circuit layout, a physical layout may be described in a suitable language (for example, LEF/DEF, or GDSII). The physical layout may comprise certain features such as, for example, paths or polygons defining areas where on an integrated circuit, for example, dopants for active layers of transistors have to be implanted, where polysilicon has to be provided to manufacture transistors, where metal tracks in a metal layer has to be manufactured, where VIA's between metal layers has to be manufactured, etc.

In FIG. 3a the specific example of IP block A 300 comprises a set of gates coupled in a specific configuration to each other to perform a specific function. This set of gates with interconnections is schematically indicated by logic block 310. Logic block 310 performs, for example, the specific function of a flip flop. Logic block 310 comprises the logic which performs the specific function. Thus, logic block 310 comprises gates, nets between gates, etc. IP block A 300 may be used in an hierarchical integrated circuit design, and, as such, IP block A 300 may also comprise other IP blocks, and inside logic block 310 these other IP blocks may be instantiated and connected to other elements of logical block 310. Logic block 310 receives from a first input pin 302 and from a second input pin 304 input signals that are used by logic block 310 to perform the specific function. The electrical conductor(s)/net(s) from the first input pin to the gates of logic block 310 are schematically drawn by means of net 306. The electrical conductor(s)/net(s) from the second input pin to the gates of logic block 310 is schematically drawn by means of net 308. In the example of IP block A 300, the logic block 310 has one logical output that is coupled with net 312 to the output pin 314 of IP block A 300. This net 312 may have a specific delay of N picoseconds for the signal generated by the logic block 310, which means that the signal arrives at the output pin 314 N picoseconds after the moment in time when logic block 310 generated this signal. The timing information may be provided by a timing analysis tool that had analyzed the design of IP block A 300 and the timing information may be stored in a suitable data format in the description of IP block A 300. It may be noted that such timing characteristics often relate to a typical worst case scenario.

When an integrated circuit design is designed, IP blocks, such as IP block A, may be reused several times. The integrated circuit design is often build up in an hierarchical way by defining inside the design several instances of specific IP blocks and connecting their input and output pins in a required manner to each other to perform the logical function or logical operation of the integrated circuit design. The IP blocks that may be instantiated at the highest level of hierarchy in the integrated circuit layout may, on their turn, comprise instances of other IP block. For example, an IP block of a multi-core processing system may be build up by connecting and combining n instances of an IP block of a single core processor in suitable manner. The IP block of the single core processor may comprise several instance of other IP blocks or cells (which are, for example, simple logical functions as adders, or NOR ports). The IP blocks and/or the cells may, for example, instantiate gates and connections between the gates. For one level of hierarchy, this concept is shown in FIG. 3b.

FIG. 3b schematically shows an example of an integrated circuit design 350. The integrated circuit is hierarchically defined on bases of a gate level netlist. The hierarchical integrated circuit design 350 defines two instances Inst1A 360, Inst2A 370 of IP block A 300, one instance InstB 380 of IP block B and one instance InstC 390 of IP block C. An output pin 362 of instance Inst1A 360 is connected via a net (a wire) to an input pin 382 of instance InstB 380. An output pin 372 of instance Inst2A 370 is connected via a net (e.g. an electrical conductor) to an input pin 392 of instance InstC 390.

Often certain timing requirements are imposed on an integrated circuit design to guarantee a correct operation of the integrated circuit that is manufactured on basis of the integrated circuit design. In the integrated circuit design timing paths are indicated by means of, for example, automatic tools. A timing path is an electrical path that a signal follows through the integrated circuit design from point x to point z. Different types of timing paths may be found in an integrated circuit design depending on the specific signals that are transferred (e.g. clock signals, or other signals) and depending on the logic that provides or executes the specific functions or actions that are performed by the IP blocks (based on the function of the logic, for example, the points x and z between which timing paths extends are determined). In the example of the hierarchical integrated circuit layout 350, two timing paths tp1, tp2 are indicated. Timing path tp1 may start in instance Inst1A 360, goes through output pin 362 via wires to input pin 382 and ends inside instance InstB 380. For example, the portion of timing path tp1 inside instance Inst1A 360 may start, for example, at an output driving gate of IP block A. Information of available timing paths may be provided in the integrated circuit design, for example, by means of properties coupled to specific nets or wires between gates.

An automatic tool (or a designer of the integrated circuit design) may define timing requirements for timing paths of integrated circuit designs. For example, seen from a reference moment in time, a signal may be required to arrive via a specific timing path at an instance of an IP block before a specific moment in time. Hereinafter, such requirement is referred to by the term setup-requirement. Alternatively, or additionally, a signal may be required to arrive via a specific timing path at an instance of an IP block after a specific moment in time. Hereinafter, such a requirement is referred to by the term hold-requirement. One timing path may have several timing requirements, such as a setup-requirement and a hold-requirement. Static timing analysis tools analyze the timing characteristics of the timing path on basis of analyzing characteristics of the gates and the nets/wires on the timing path. The analysis may be often performed for different (predefined) operational conditions. During the analysis, the static timing analysis tools may check whether requirements are met by the timing paths, whether they are violated, and/or what a slack is with respect to the specific timing requirements. The slack is a value in the time domain expressing with how much time the requirement is violated or how well the requirement is met. In an example, only the worst slack value may be provided for all the different analyzed operational conditions. For example, when a specific timing path is fast enough under all circumstances with respect to a setup-requirement it may have a positive slack value of a specific number of picoseconds. The "positive slack" refers to the fact that the timing path may be changed up to a certain extent before a timing requirement may be violated, namely, only such that the timing path does not become more than the specific number of picoseconds slower under the worst operational condition. When a timing path does not meet a setup-requirement, it is termed a setup-critical timing path, and when a timing path does not meet a hold-requirement, it is termed a hold-critical timing path.

The hierarchical integrated circuit design 350 of FIG. 3b may be analyzed by timing analysis tools. As discussed above, timing paths tp1, tp2 may be indicated, or information about timing paths tp1, tp2 may be stored in the integrated circuit design and the results of a static timing analysis may be provided as well. In the example, the timing information 352 available for timing path tp1 corresponds to timing path tp1 being setup critical and having a slack value of −20 picoseconds. This means that timing path tp1 is too slow and that a signal generated inside instance Inst1A 360 may arrive in the worst case about 20 picoseconds too late at a specific node in instance InstB 380. In the example, the timing information 362 available for timing path tp2 corresponds to timing path tp2 being hold critical and having a slack value of −50 picoseconds. This means that timing path tp2 may be too fast and that a signal generated inside instance Inst1A 360 may arrive in the worst case about 50 picoseconds too early at a specific node in instance InstC 390.

As a solution for solving or at least diminishing one or more of the above violations of the timing requirements, a solution in IP block A may be considered, for example, by driving the output pin faster or slower. However, in the above example, this seems to be impossible, because the output pin has to be at least be driven 20 picoseconds faster and has to be at least be driven 50 picoseconds slower. Thus, the possible solutions are contradictory. The proposed solution may be to change the definition of IP block A 300 by cloning output pin 314. Cloning means that a second output pin is created which is logically equivalent to the already existing output pin 314, but which is, internally inside IP block A 300, connected via another net/wire to the same gates of the IP block A 300 as to which output pin 314 is connected. Also, the integrated circuit design may be changed such that one of the timing paths tp1, tp2 of which the requirements is in contradiction to the other one of the timing paths tp1, tp2 is coupled to the cloned output pin of one of the instances.

Figure 4A:
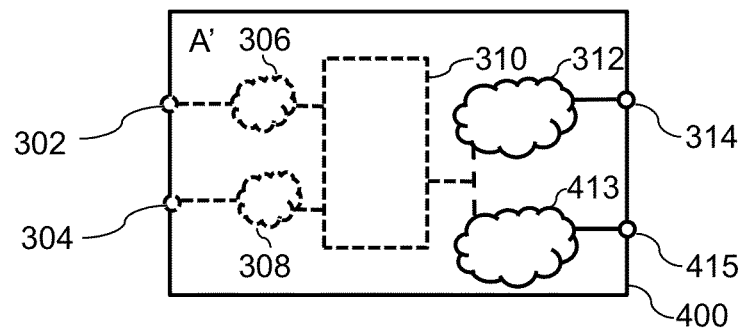

In FIG. 4*a* the result of the cloning is shown. FIG. 4*a* schematically shows an example of an adapted IP block A' 400 in which an output pin is cloned. Adapted IP block A' 400 is similar to IP block A 300 with respect to its input pins 302, 304, the nets 306, 308 that connect the input pins 302, 304 to the logic block 310 that schematically represents the logical function/operation performed by the IP block. The adapted IP block A' 400 has the output pin 314 that is connected with net 312 to the logic block 310 as IP block A 300 of FIG. 3*a*. An additional output pin 415 is added to the adapted IP block A' 400 which is logically equivalent to the output pin 314 of the IP block A 300. "Being logically equivalent" may imply that the additional output pin 415 is connected with an additional net 413 to logic block 310 that schematically represents the logical function/operation performed by the adapted IP block A' 400. With these changes, when timing is to be adapted within IP block A' 400, the timing of the two output pins 314, 415 may be adjusted independently of each other. The two nets 312, 413 provide the possibility to perform this independent optimization.

Figure 4B:
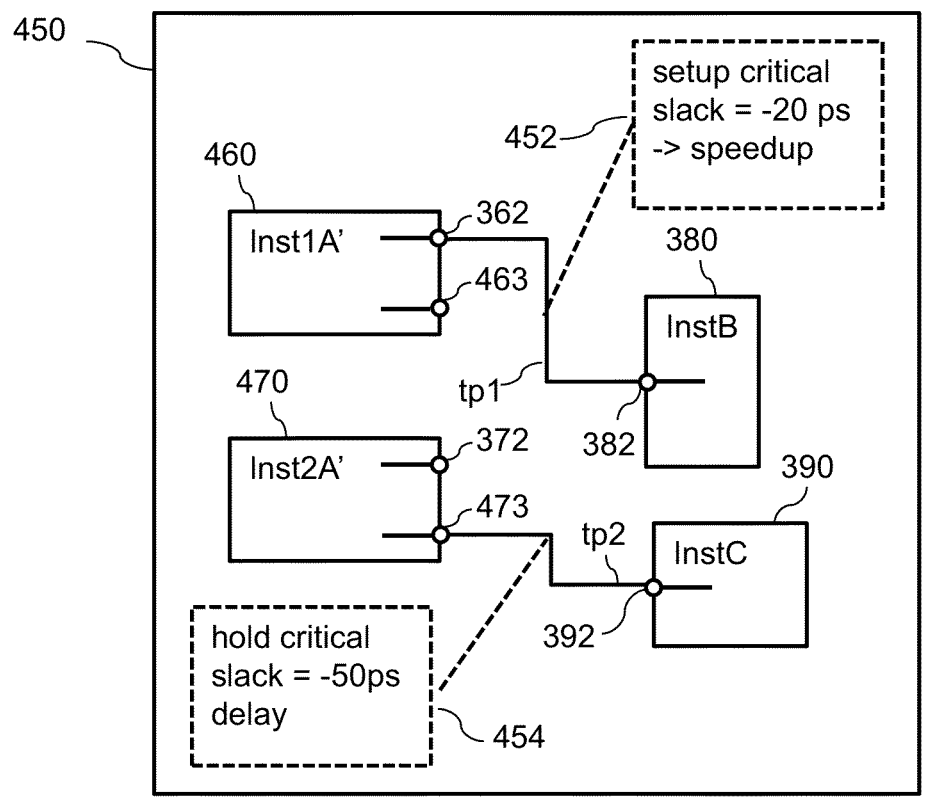

FIG. 4*b* schematically shows an example of an adapted hierarchical integrated circuit design 450 in which instances of the adapted IP block A' 400 are provided and a path through the layout has been reconnected. The adapted hierarchical integrated circuit design 450 is based on hierarchical integrated circuit design 350 and has been created starting from integrated circuit design 350 by replacing the original instance Inst1A 360, Inst2A 370 by instance Inst1A' 460, Inst2A' 470 of IP block A' 400. Subsequently, one of the nets/wires between these instance Inst1A' 460, Inst2A' 470 of IP block A' and instances InstB 380, InstC 390 of the IP block B and C, respectively, is disconnected from the original output pin of IP block A, and is connected to the additional/cloned output pin of adapted IP block A'. As shown in FIG. 4*b*, output pin 362 of a first instance Inst1A' 460 of the adapted IP block A' is coupled to the input pin 382 of the instance InstB 380 of the IP block B, and the additional output pin 463 of the first instance Inst1A' 460 of the adapted IP block A' is unconnected. As shown in FIG. 4*b*, additional output pin 473 of a second instance Inst2A' 470 of the adapted IP block A' is coupled to the input pin 392 of the instance InstC 390 of the IP block C, and the original output pin 372 of the second instance Inst2A' 470 of the adapted IP block A' is unconnected.

Now, in adapted integrated circuit design 450 the first time path tp1 starts in the first instance Inst1A' 460 of the adapted IP block A' goes through the (original) output pin 362 and through the input pin 382 of the instance InstB 380 of IP block B and ends inside the instance InstB 380 of IP block B. The timing information 452 of the first time path tp1 may be updated by adding the property that this time path needs to be speedup. This additional information may be used by integrated circuit design optimization tools to speed up the first time path. In another embodiment, the original timing information 352 is still connected to the first timing path tp1, and the integrated circuit design optimization tool that reads this original timing information 352 may decide that the first timing path tp1 is to be speeded up. The second time path tp2 starts in the second instance Inst2A' 470 of the adapted IP block A' goes through the (additional/cloned) output pin 473 and through the input pin 392 of the instance InstC 390 of IP block C and ends inside the instance InstC 390 of IP block C. It may be that updated timing information 454 is coupled to the second timing path tp2 which indicates that the second timing path tp2 is to be delayed in order to meet the hold-requirement. The updated timing information 454 may be used by integrated circuit design optimization tools to delay the second timing path tp2. In line with the above disclosure, the original timing information 354 may also be used by integrated circuit design optimization tools to decide that the second timing path tp2 is to be delayed.

Figure 5:
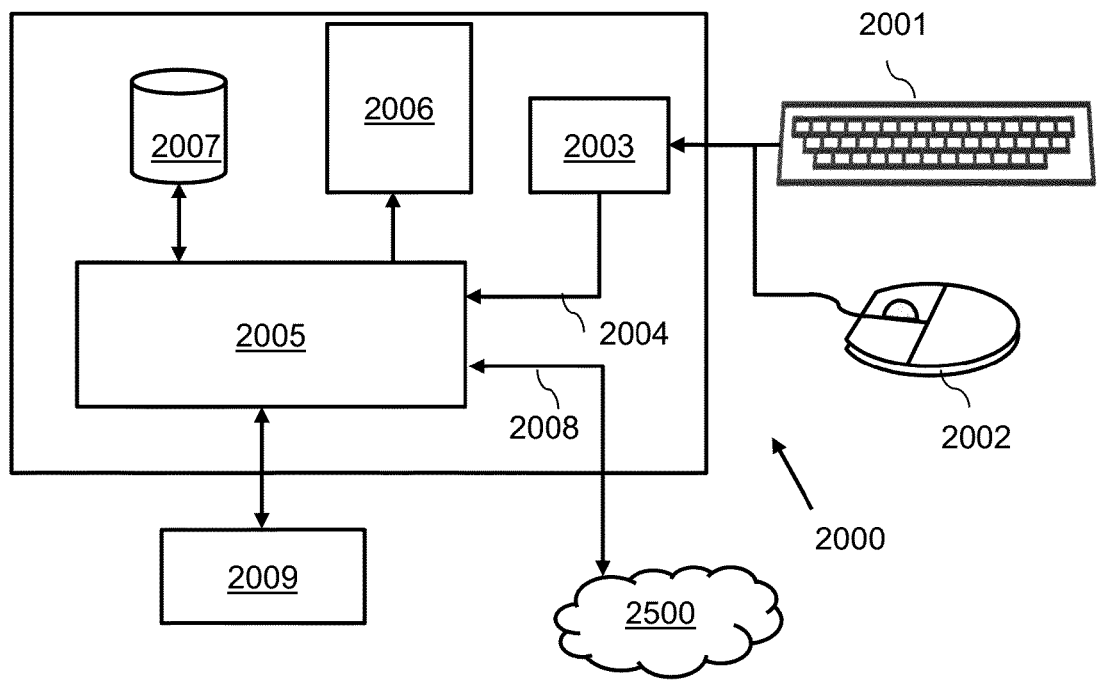

FIG. 5 schematically shows an exemplary user interaction system 2000 having a programmable processor 2005. The user interaction system 2000 is shown to be a personal computer, but may be any type of suitable user interaction system 2000. The programmable processor 2005 may comprise one or more components of system 100. The user interaction system 2000 further comprises a storage unit 2007, a user input 2003 and a display 2006. The user input 2003 allows the user to input user data and user instructions 2004 to the processor 2005 by e.g. using a keyboard 2001 or a mouse 2002. Also, although not shown, the display 2006 may comprise a touch-sensitive surface for enabling the user to provide user data and user instructions to the user input 2003 by means of touching the display 2006. The processor 2005 is arranged to perform any one of the methods according to the above discussed examples, to receive user data and user instructions 2004, to present visual information on the display 2006 and to communicate with a data I/O device 2009, such as an optical disc drive or a solid state reader/writer. The processor 2005 is arranged to cooperate with the storage unit 2007, allowing storing and retrieving information on the storage unit 2007, such as the hierarchical integrated circuit design, the timing characteristics, the selected candidate output pin, the cloned output pin and the adapted hierarchical integrated circuit design. The user interaction system 2000 may further comprise a communication channel 2008 allowing the processor 2005 to connect to an external cloud 2500 for communicating with other devices in the cloud. The external cloud may e.g. be the Internet. The user interaction system 2000 may allow the user to start any one of the methods according to the above discussed examples and/or inspecting on the display 2006 the hierarchical integrated circuit design, the timing characteristics, the selected candidate output pin, the cloned output pin and the adapted hierarchical integrated circuit design. The processor 2005 may be capable to read, using the data I/O device 2009, a computer readable medium comprising a program code. The processor 2005 may be capable to read, using the data I/O device 2007, a computer readable medium comprising a computer program product comprising instructions for causing the user interaction system 2000 to perform a method of making a hierarchical integrated circuit design. The method comprises receiving an hierarchical integrated circuit design and one or more timing characteristics of timing paths in the hierarchical integrated circuit design. The hierarchical integrated circuit design comprises a set of IP blocks and one or more instances of at least one IP blocks of the set. The IP blocks of the set represent portions of the integrated circuit design. At least one of the instantiated IP blocks has at least one output pin. The timing characteristics comprise information on timing violations for timing paths in the hierarchical circuit design. The method further comprises selecting a candidate output pin belonging to a specific IP block of the set where the candidate output pin is coupled to at least a first timing path having a timing violation and is coupled to a second timing path. Therein the second timing path may not provide enough timing slack to solve the timing violation of the first timing path. The method further comprises cloning the selected candidate output pin by adapting the hierarchical integrated circuit design and creating in the specific IP block a cloned output pin. The cloned output pin may be an additional output pin in the specific IP block that has a logical output equivalent to a logical output the candidate output pin. The method further comprises adapting the hierarchical integrated circuit design to reconnect one of the first timing path or the second timing path to the cloned output pin of one of the instances of the specific IP block to which the one of the first timing path and the second timing path is connected. The method further comprises providing the adapted hierarchical integrated circuit design. After the adapted hierarchical integrated circuit design is provide, an integrated circuit may be manufactured from the design, by (selectively) depositing, removing or implanting materials in the areas defined by the design, e.g. using a set of masks corresponding to the design.

Figure 6:
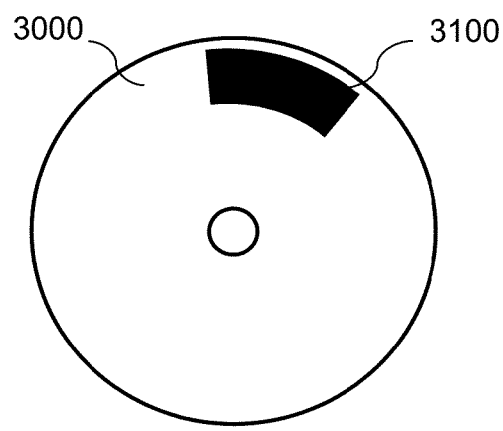
FIG. 6 shows a computer readable medium comprising a computer program product.

FIG. 6 shows a computer readable medium 3000 comprising a computer program product 3100, the computer program product 3100 comprising instructions for causing a processor apparatus to perform a method of making a hierarchical integrated circuit design, the method comprises receiving an hierarchical integrated circuit design and one or more timing characteristics of timing paths in the hierarchical integrated circuit design. The hierarchical integrated circuit design comprises a set of IP blocks and one or more instances of at least one IP blocks of the set. The IP blocks of the set represent portions of the integrated circuit design. At least one of the instantiated IP blocks has at least one output pin. The timing characteristics comprise information on timing violations for timing paths in the hierarchical circuit design. The method further comprises selecting a candidate output pin belonging to a specific IP block of the set where the candidate output pin is coupled to at least a first timing path having a timing violation and is coupled to a second timing path. Therein the second timing path may not provide enough timing slack to solve the timing violation of the first timing path. The method further comprises cloning the selected candidate output pin by adapting the hierarchical integrated circuit design and creating in the specific IP block a cloned output pin. The cloned output pin may be an additional output pin in the specific IP block that has a logical output equivalent to a logical output the candidate output pin. The method further comprises adapting the hierarchical integrated circuit design to reconnect one of the first timing path or the second timing path to the cloned output pin of one of the instances of the specific IP block to which the one of the first timing path and the second timing path is connected. The method further comprises providing the adapted hierarchical integrated circuit design. The computer program product 3100 may be embodied on the computer readable medium 3000 as physical marks or by means of magnetization of the computer readable medium 3000. However, any other suitable embodiment is conceivable as well. Furthermore, it will be appreciated that, although the computer readable medium 3000 is shown in FIG. 6 as an optical disc, the computer readable medium 3000 may be any suitable computer readable medium, such as any tangible, non-transitory data carrier, such as a hard disk, solid state memory, flash memory, etc., and may be non-recordable or recordable.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-rom or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Because the apparatus implementing the present invention is, for the most part, composed of electronic components and circuits known to those skilled in the art, circuit details have not been explained in any greater extent than that considered necessary, for the understanding and appreciation of the underlying concepts of the present invention and in order not to obfuscate or distract from the teachings of the present invention.

All or some of the software described herein may be received elements of system 2000, for example, from computer readable media such as a storage unit 2007 (memory) or other media on other computer systems. Such computer readable media may be permanently, removably or remotely coupled to an information processing system such as system 2000. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, system 2000 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Furthermore, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A system for making a hierarchical integrated circuit design, the system comprising:
  a processor input configured to receive a hierarchical integrated circuit design and one or more timing characteristics of timing paths in the hierarchical integrated circuit design, the hierarchical integrated circuit design comprising a set of IP blocks and one or more instances of at least one IP block of the set, the IP blocks of the set representing portions of an integrated circuit design represented by the hierarchical integrated circuit design, the at least one IP block having at least one output pin, the timing characteristics comprising information on timing violations for timing paths in the hierarchical integrated circuit design,
  a selector implemented by a programmable processor and configured to select a candidate output pin belonging to a specific IP block of the set, the candidate output pin being coupled to at least a first timing path having a timing violation and being coupled to a second timing path, wherein the second timing path does not provide enough timing slack to solve the timing violation of the first timing path, the selector configured to receive the hierarchical integrated circuit design and the timing characteristics, from the processor input,
  a cloner implemented by the programmable processor and configured to adapt the hierarchical integrated circuit design and create in the specific IP block a cloned output pin, the cloned output pin being an additional output pin in the specific IP block and the cloned output pin having a logical output equivalent to a logical output of the candidate output pin, the cloner being coupled to the selector for receiving the selected candidate output pin, the hierarchical integrated circuit design and the timing characteristics,
  a re-connector implemented by the programmable processor and configured to adapt the hierarchical integrated circuit design and reconnect one of the first timing path and the second timing path to the cloned output pin of an instance of the specific IP block to which the one of the first timing path and the second timing path is connected, the re-connector being coupled to the cloner for receiving the adapted hierarchical integrated circuit design and information on the cloned output pin, and
a physical output configured to output the adapted hierarchical circuit design.

2. The system according to claim 1 comprising
a timing improver configured to adapt the hierarchical integrated circuit design for improving timing characteristics of at least the first timing path.

3. The system according to claim 2, wherein the timing improver is further configured to adapt the hierarchical integrated circuit design for improving timing characteristics of the second timing path.

4. The system according to claim 1, wherein the received hierarchical integrated circuit design comprises at least a gate level netlist of the hierarchical integrated circuit design, and the cloner is further configured to reconnect one of the at least two timing paths in the gate level netlist.

5. The system according to claim 4, wherein the received hierarchical integrated circuit design further comprises a physical layout of the hierarchical integrated circuit design and wherein the timing improver is configured to at least adapt the physical layout while further adapting the hierarchical integrated circuit design.

6. The system according to claim 1, wherein the timing paths comprise timing paths of the types hold and setup, the selector being further arranged to select the candidate output pin such that the first timing path is of a first type being one of hold and setup, and the second timing path is of a second type being the another one of hold and setup.

7. The system according to claim 6, wherein timing violations are expressed as negative slack values in the time domain and the timing characteristics also comprise positive slack values in the time domain for timing paths not violated timing requirements, the selector being further arranged to select the candidate output pin such that the sum of the slack of the first timing path and the second timing path is smaller than a predefined threshold value.

8. The system according to claim 7, wherein, when the candidate output pin is coupled to more than two timing paths, the selector is further arranged to select the candidate output pin such that the first timing path is of the first type having the most negative slack value and the second timing path is one of the timing paths of the second type being coupled to the candidate output pin having the smallest slack value.

9. The system according to claim 1, wherein the specific IP block comprise logic for providing the logical output, the logic being coupled by an electrical connection to the selected candidate output pin, the cloner being further configured to couple the cloned output pin to the logic by an additional electrical connection for proving the logical output to the cloned output pin.

10. A method of making a hierarchical integrated circuit design, the method comprising
receiving, at a processor input of programmable processor, a hierarchical integrated circuit design and one or more timing characteristics of timing paths in the hierarchical integrated circuit design, the hierarchical integrated circuit design comprising a set of IP blocks and one or more instances of at least one IP block of the set, the IP blocks of the set representing portions of the integrated circuit design, the at least one IP block having at least one output pin, the timing characteristics comprising information on timing violations for timing paths in the hierarchical circuit design,
selecting with a programmable processor, a candidate output pin belonging to a specific IP block of the set, the candidate output pin being coupled to at least a first timing path having a timing violation and being coupled to a second timing path, wherein the second timing path does not provide enough timing slack to solve the timing violation of the first timing path,
cloning with a programmable processor, the selected candidate output pin by adapting the hierarchical integrated circuit design and creating in the specific IP block a cloned output pin, the cloned output pin being an additional output pin in the specific IP block and the cloned output pin having a logical output equivalent to a logical output of the candidate output pin,
adapting with a programmable processor, the hierarchical integrated circuit design to reconnect one of the first timing path or the second timing path to the cloned output pin of an instance of the specific IP block to which the one of the first timing path and the second timing path is connected, and
outputting with a programmable processor, the adapted hierarchical integrated circuit design.

11. A method according to claim 10, the method further comprises
improving timing characteristics of at least the first timing path by further adapting the hierarchical integrated circuit design.

12. A method according to claim 11, wherein the improving of the timing characteristics also comprises improving timing characteristics of the second timing path.

13. A method according to claim 10, wherein the received hierarchical integrated circuit design comprises at least a gate level netlist of the hierarchical integrated circuit design, and wherein the cloning of the selected candidate output pin and the adapting the hierarchical layout to reconnect one of the at least two timing paths are performed by adapting the gate level netlist.

14. A method according to claim 11, wherein the received hierarchical integrated circuit design further comprises a physical layout of the hierarchical integrated circuit design and wherein the further adapting of the hierarchical integrated circuit design for adapting a hierarchical integrated circuit design is performed by at least adapting the physical layout.

15. A method according to claim 10, wherein the timing paths comprise timing paths of the types hold and setup, the first timing path is of a first type being one of hold and setup, and the second timing path is of a second type being the another one of hold and setup.

16. A method according to claim 15, wherein timing violations are expressed as negative slack values in the time domain and the timing characteristics also comprise positive slack values in the time domain for timing paths not violated timing requirements, wherein the sum of the slack of the first timing path and the second timing path is smaller than a predefined threshold value.

17. A method according to claim 16, wherein, the candidate output pin is coupled to more than two timing paths, the first timing path is of the first type having the most negative slack value and the second timing path is one of the timing paths of the second type being coupled to the candidate output pin having the smallest slack value.

18. A method according to claim 10, wherein the specific IP blocks comprise logic for providing the logical output, the logic being coupled by an electrical connection to the selected output pin, the cloning of the selected candidate output pin comprises coupling the cloned output pin to the logic by an additional electrical connection for proving the logical output to the cloned output pin.

19. A method as claimed in claim 10, further comprising manufacturing an integrated circuit according to the outputted adapted hierarchical integrated circuit design.

20. A non-transitory tangible computer readable storage medium comprising data loadable in a programmable apparatus, the data representing instructions executable by the programmable apparatus, said instructions comprising one or more receiving instructions for receiving an hierarchical integrated circuit design and one or more timing characteristics of timing paths in the hierarchical integrated circuit design, the hierarchical integrated circuit design comprising a set of IP blocks and one or more instances of at least one IP block of the set, the IP blocks of the set representing portions of the integrated circuit design, the at least one IP block having at least one output pin, the timing characteristics comprising information on timing violations for timing paths in the hierarchical circuit design, one or more selecting instructions for selecting a candidate output pin belonging to a specific IP block of the set, the candidate output pin being coupled to at least a first timing path having a timing violation and being coupled to a second timing path, wherein the second timing path does not provide enough timing slack to solve the timing violation of the first timing path, one or more cloning instructions for cloning the selected candidate output pin by adapting the hierarchical integrated circuit design and creating in the specific IP block a cloned output pin, the cloned output pin being an additional output pin in the specific IP block and the cloned output pin having a logical output equivalent to a logical output of the candidate output pin, one or more adapting instructions for adapting the hierarchical integrated circuit design to reconnect one of the first timing path or the second timing path to the cloned output pin of an instance of the specific IP block to which the one of the first timing path and the second timing path is connected, and one or more outputting instructions for outputting the adapted hierarchical integrated circuit design.

\* \* \* \* \*